Sept. 14, 1937.  J. J. TOLLAND  2,093,219
VALVE SEAT LOCK
Filed April 16, 1934   2 Sheets-Sheet 1

INVENTOR.
JOHN J. TOLLAND
BY
ATTORNEY.

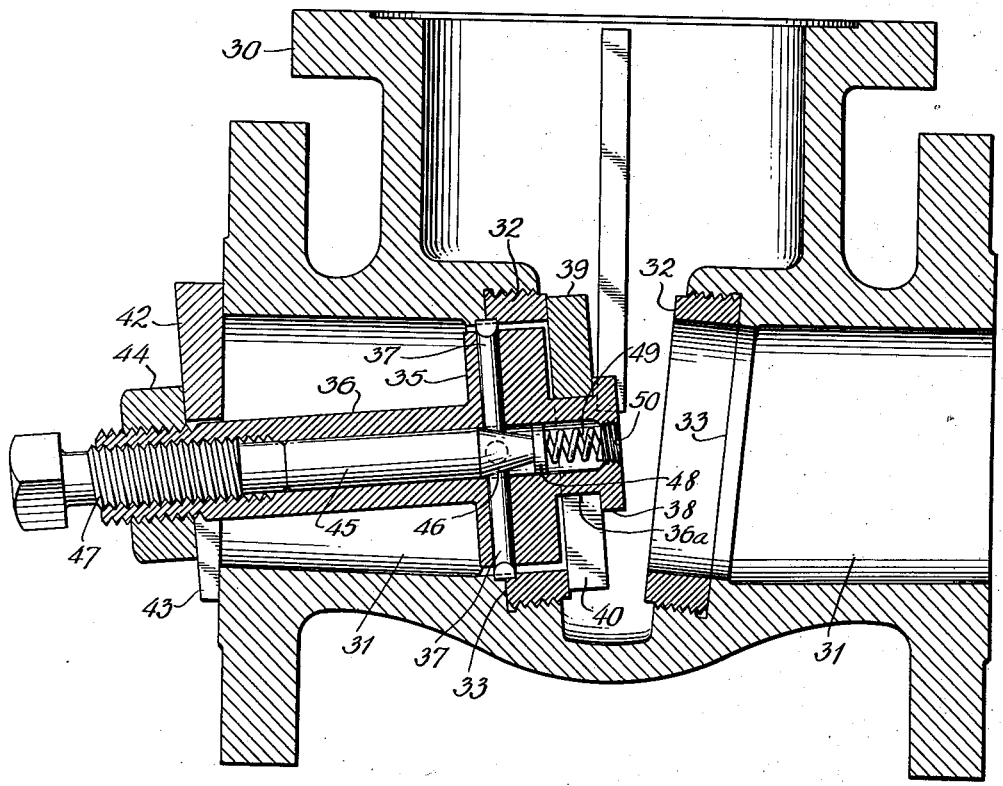

Patented Sept. 14, 1937

2,093,219

UNITED STATES PATENT OFFICE 2,093,219

VALVE SEAT LOCK

John J. Tolland, West Lawn, Pa., assignor, by mesne assignments, to American Chain & Cable Company, Inc., a corporation of New York Application April 16, 1934, Serial No. 720,674

3 Claims. (Cl. 81—3)

The present invention relates to a method of and means for locking a seat ring in a valve body.

Valve seats are commonly threaded into the valve bodies so that they may be unscrewed for repairs or replacement. However, unless the seat rings are locked in place they have a tendency to unscrew in service. This tendency is particularly marked in globe valves in which friction between the valve disk and the seat is apt to unscrew the seat from the body. Usually seat rings are provided with a sealing portion which bears against a finished surface on the body so as to prevent leakage through the threaded joint of the ring with the body. It is obvious that a threaded joint cannot be maintained fluid-tight and if the seat ring loosens slightly the seal is broken and leakage results. This tendency for the seat ring to become loosened from the body is present not only in globe valves but in other types of valves as well, as for instance, in gate valves. It is not only the drag of the closure member against the seat ring which causes such loosening of the parts, but it has been found that even with the valve open, variations in temperature may cause sufficient contraction and expansion to break the seal between the ring and the body.

A simple way of locking the seat ring in place is to make one or more indentations with a chisel-like tool in the ring and valve body across their junction line. The resultant distortion or burring of the threads prevents accidental unscrewing and yet it does not prevent intentional unscrewing of the seat with the usual tools provided for assembling or disassembling valve rings. If in a globe valve the indentation is made with a hammer and chisel, the impact will cause a slight bulging of the metal on the outer or seating surface of the valve ring and although such a bulge may be very slight indeed, it will seriously affect the tightness of the valve. A bulge of a few thousandths of an inch is fatal to the proper seating of the valve disc.

An object of the present invention is to provide a tool in which the indentation may be made by pressure rather than impact. In the case of a globe valve the pressure of the tool is exerted against the inner face of the ring tending to force the outer face outward. In the case of a gate valve, on the other hand, the pressure is applied to the inner cylindrical face of the ring and there is less tendency to bulge the seating face of the ring. However, there is some tendency for the metal to flow and hence it is a further object of the invention to provide means for holding the seating face of the valve ring perfectly true during the indenting process.

Other objects and advantages of the invention will appear in the following description of certain preferred embodiments and thereafter the novelty and scope of the invention will be pointed out in the claims.

In the accompanying drawings.

Figure 1:
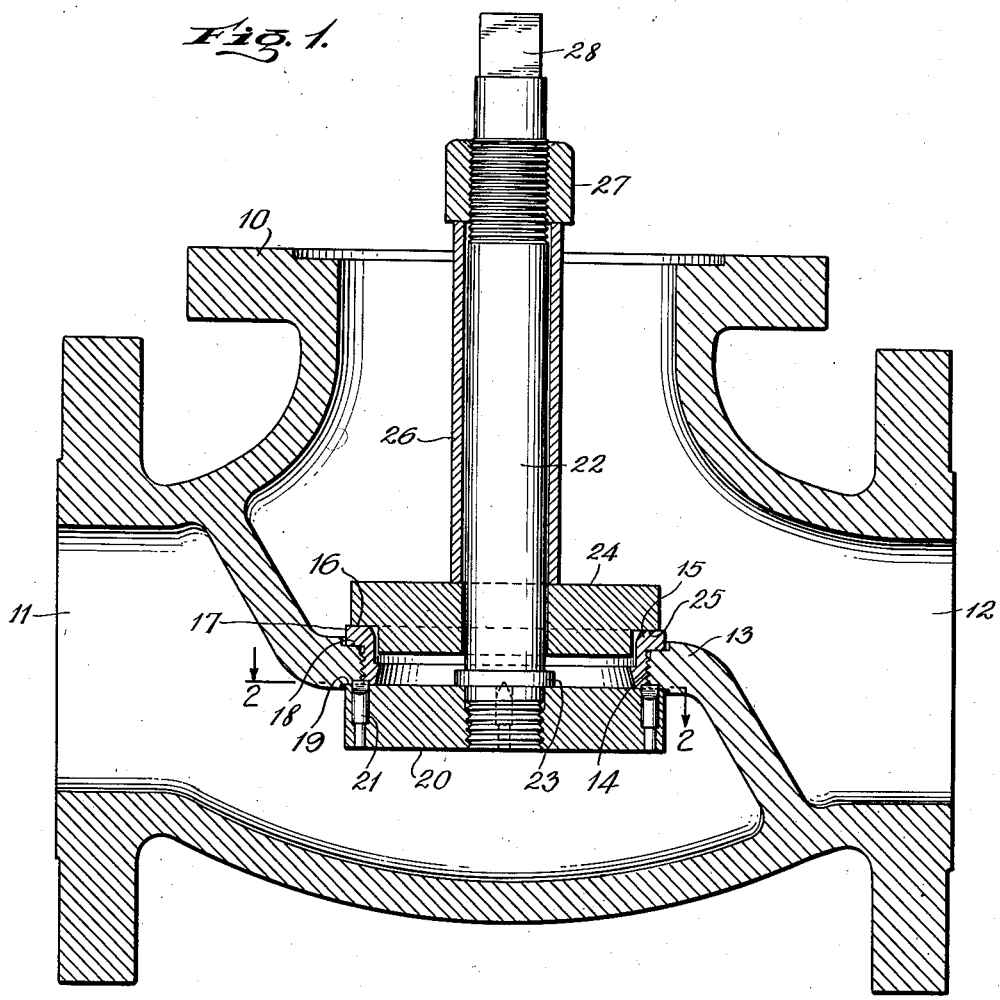
Figure 1 is a view in longitudinal section through the body and seat ring of a globe valve with the indenting tool applied thereto and forming locking indentations between the ring and the body.

In Figure 1 a globe valve body is shown at 10. This body is provided with alined fluid ports 11 and 12 which are separated by a diaphragm 13 having a threaded opening 14 therein. A seat ring 15 is screwed into this threaded opening. The upper face 16 of this seat ring provides a seat for a valve disk, not shown. The seat ring has an annular flange 17 which seats in a countersunk recess 18 to make a tight seal between the seat ring and the valve body. The opening 14 is also countersunk on its inner side to form a recessed surface 19 and the seat ring 15 is made of such thickness that its inner end will be flush with the surface 19.

Figure 2:
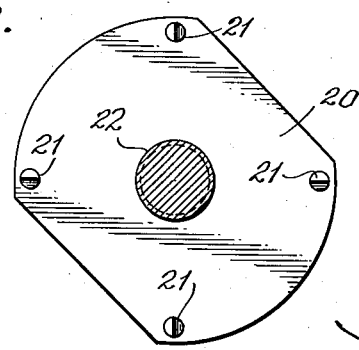
Fig. 2 is a view of the tool in transverse section taken on the line 2—2 of Fig. 1; and, Fig. 3 is a view in longitudinal section of the body and seat rings of a gate valve with another form of indenting tool applied thereto and locking one of the seat rings in position.

The seat ring is locked in place after it has been screwed into the opening 14 by making indentations extending across the surface 19 and the inner end of the seat ring. The indentations are made with a tool which comprises a tool head 20 and a set of chisel-like tools 21 carried thereby. These chisels are seated in suitable sockets formed in the tool head and project from the upper face of the tool head to an extent equal to that of the desired depth of the indentations. The tool head is formed with a central threaded opening into which is screwed one end of a stem 22. The stem is provided with a collar 23 which seats against the upper face of the head 20 when the stem has been slightly screwed into place. A thrust plate 24 slides on the stem 20 and has a finished bearing surface 25 which rests upon the seating face 16 of the seat ring 15. A sleeve 26 slides upon the stem 22 and bears at its inner end against the thrust plate 24. A nut 27 screwed on the stem 22 bears against the outer end of the sleeve 26. The stem is provided with a squared end 28 to which a wrench may be applied to prevent it from turning during the indenting process. It will be noted that the tool head 20, as shown in Fig. 2, is made narrow enough to permit of inserting it either through the port 11 or through the opening 14 to the under side of the diaphragm 13.

In operation the seat ring is tightly screwed into the opening 14 until it is seated firmly against the sealing surface 18. The tool head may then be introduced through the port 11, or prior to screwing in the seat ring it may have been introduced through the port 14. The stem 22 is now passed through the seat ring and screwed firmly into the tool head. The thrust plate 24 is dropped over the stem 20 and seated against the seating surface of the valve ring and after the sleeve 26 has also been mounted on the stem, the nut 27 is applied. The tool is then held against turning by applying a wrench to the squared end 28 and the nut 27 is screwed down upon the sleeve 26, drawing the tool head 20 upward and forcing the chisels 21 into the face 19 of the body and also the inner face of the seat ring. Obviously the tool head must be adapted for the particular size of seat ring to be locked and the chisels 21 are properly positioned to bite into the metal at the proper points along the junction line of the seat ring and valve body. While in the drawings four of these tools are shown, obviously any number may be employed, depending upon requirements. The chisels are forced into the ring and valve body by pressure instead of impact, and as the chisels are being forced in, the seating surface 16 of the valve ring is held true by the thrust plate 24. The nut 27 is turned until the tool head 20 comes up against the surface 19 as a stop. Thereafter the tool is disassembled by turning the stem 22 so that it will become unscrewed from the head 20, the latter being held from turning by the chisels 21. The tool head 20 upon being disconnected from the stem 22 will drop and may be removed through the port 11.

The tool used for locking seat rings in a gate valve body differs in certain respects from that already described, but the same principle is employed namely that of making indentations by pressure rather than impact and of supporting the seating surface of the seat ring against distortion during indentation. The body of a gate valve is shown at 30 in Fig. 3. Opposed ports 31 are provided in the body for the passage of fluid therethrough. Each port is formed with an annular recess at its inner end to receive a seat ring 32. The inner face of each seat ring is finished to seat firmly against a corresponding face at the inner end of a recess so as to form a tight seal at the joint 33. The indentations which lock the seat rings to the valve body are made in the inner cylindrical face of each seat ring and extend transversely across the joint 33.

The tool with which these indentations are made consists of a tool head 35 provided with an outwardly extending stem 36. Tools of chisel form 37 are mounted to slide radially in the tool head 35. At the inner end of the tool head there is an extension 36a of the stem 36 which terminates in an enlargement 38. A thrust plate 39 which is substantially of the diameter of the seating face of the seat ring is formed with a notch 40 so that it may be slipped over the extension 36a between the head 35 and enlargement 38. Since the seat rings are usually inclined from normal to the ports, a wedge plate 42 is provided which is notched as indicated at 43 so that it may be slipped over the stem 36, bearing against the outer face of the valve body on one side and on the other against a nut 44 screwed upon the stem 36.

The chisels 37 are forced outwardly by a pin 45 which slides in an axial bore of the stem 36 and has a tapered portion 46 engaging the inner ends of the chisels. A screw 47 threaded into the bore of the stem 36 bears against the pin 45 and provides means for forcing the latter axially to press the chisels outwardly into operative engagement with the valve body and seat ring. The inner end of the pin 45 terminates in a head 48 and a compression spring 49 is fitted between this head and a screw plug 50.

In operation, after a seat ring 32 has been screwed tightly into place, the tool is introduced through the adjacent port with the chisels withdrawn. Thereupon the thrust plate 39 is fitted into place to support the outer face of the seat ring, as shown in Fig. 3, and the wedge 42 is also fitted between the valve body and the nut 44. After the parts are in proper position the nut 44 is screwed up against the nut 42 to clamp the thrust plate tightly against the seating face of the seat ring. Thereafter the screw 47 is tightened up to force the pin 45 inwardly and force the chisels 37 outwardly until they have bitten to the desired extent into the body and seat ring across the joint 33. In the meantime, the thrust plate 39 prevents any bulging of the seat surface that may result from flow of metal as the chisels are forced into the seat ring.

After the indentations have been formed the screw 47 is unscrewed and the spring 49 then forces the pin 45 outwardly, releasing the pressure on the chisels. The nut 44 is then unscrewed and the wedge 42 and thrust plate 39 are removed, after which the tool head is withdrawn from the valve bodies. In the same way, the opposite seat ring may be locked in place.

It will be understood that the embodiments described above are to be taken as illustrative and not limitative of the invention and the right is reserved to various changes in form, construction and arrangement of parts within the spirit and scope of the following claims.

I claim:

1. An indenting tool for locking a threaded seat ring against accidental unscrewing from a valve body, said tool comprising, a chisel, means for pressing the chisel into the ring and the body to indent the same across a junction line thereof at the end of the ring opposite the seating face of the ring, and a thrust plate on the tool adapted to support the seating face of the ring against distortion by the indenting pressure while said pressure is being applied.

2. An indenting tool for locking a threaded seat ring against accidental unscrewing from a valve body, said tool comprising, a head, chisels carried thereby and adapted to bear against one side of the valve ring, a stem detachably secured to the head and adapted to project through the ring, a thrust plate movable on the stem and adapted to bear against the other side of the valve ring, and pressure means for causing relative movement of the chisels toward the thrust plate to force the chisels into the ring.

3. An indenting tool for locking a threaded seat ring against accidental unscrewing from a valve body, said tool comprising, a head, chisels carried thereby and adapted to bear against one side of the valve ring, a stem detachably secured to the head and adapted to project through the ring, a thrust plate movable on the stem and adapted to bear against the other side of the valve ring, and a nut threaded upon the stem and adapted to exert pressure on the thrust plate.

JOHN J. TOLLAND.